(12) United States Patent
Bishop et al.

(10) Patent No.: US 8,694,900 B2
(45) Date of Patent: Apr. 8, 2014

(54) STATIC DEFINITION OF UNKNOWN VISUAL LAYOUT POSITIONS

(75) Inventors: Jesse Bishop, Redmond, WA (US); Ruurd Johan Boeke, Redmond, WA (US); Terry Adams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 693 days.

(21) Appl. No.: 12/966,884

(22) Filed: Dec. 13, 2010

(65) Prior Publication Data

US 2012/0151389 A1    Jun. 14, 2012

(51) Int. Cl.
*G06F 3/048* (2013.01)
(52) U.S. Cl.
USPC .......................................... 715/763; 715/764
(58) Field of Classification Search
USPC .................................................. 715/763, 764
See application file for complete search history.

(56) References Cited

U.S. PATENT DOCUMENTS

| 5,796,401 | A | 8/1998 | Winer | |
|---|---|---|---|---|
| 7,636,093 | B1 | 12/2009 | Kuwamoto | |
| 7,739,611 | B2* | 6/2010 | Hirschberg et al. | 715/762 |
| 7,934,165 | B2* | 4/2011 | Corona | 715/769 |
| 2003/0067489 | A1 | 4/2003 | Wong | |
| 2005/0046630 | A1 | 3/2005 | Jacob | |
| 2005/0229157 | A1 | 10/2005 | Johnson | |
| 2006/0150104 | A1* | 7/2006 | Lira | 715/733 |
| 2007/0180362 | A1 | 8/2007 | Hung | |
| 2008/0120534 | A1 | 5/2008 | Moore | |
| 2008/0218532 | A1 | 9/2008 | Young | |
| 2009/0144652 | A1 | 6/2009 | Wiley | |
| 2009/0228784 | A1 | 9/2009 | Drieu | |
| 2010/0017730 | A1* | 1/2010 | Coppedge et al. | 715/764 |
| 2010/0122155 | A1* | 5/2010 | Monsarrat | 715/234 |
| 2010/0235769 | A1 | 9/2010 | Young | |

OTHER PUBLICATIONS

Scott Furman, et al. "Positioning HTML Elements with Cascading Style Sheets", Published Date: Published Date: Jan. 31, 1997; 11 pages; http://www.w3.org/TR/WE-positioning-970131.

* cited by examiner

*Primary Examiner* — Omar Abdul-Ali
(74) *Attorney, Agent, or Firm* — Carole Boelitz; Micky Minhas

(57) ABSTRACT

The subject disclosure relates to applying layout changes and/or animations in a computing system by statically defining unknown visual layout positions of elements within a user interface. Changes that are to be applied to the elements in a user interface are intercepted by mechanism as described herein that applies the changes as a function of a static reusable component. The static reusable component can be applied across various platforms. Animation is performed on a first element as described herein based at least in part on layout input properties of the first element or layout input properties of a second element that is associated with the first element. As additionally described herein, a dynamic graphical layout position can be described based on a definition of an initial layout position and calculation of a resultant layout position, wherein the positions are defined relative to an element or set of elements.

18 Claims, 11 Drawing Sheets

STATIC DEFINITION OF UNKNOWN VISUAL LAYOUT POSITIONS

TECHNICAL FIELD

The subject disclosure relates to graphical interfaces, and, more specifically, to describing dynamic graphical layout positions.

BACKGROUND

As computing technology advances and computing devices become more prevalent, computer programming techniques have adapted for the wide variety of computing devices in use. For instance, program code can be generated according to various programming languages to control computing devices ranging in size and capability from relatively constrained devices such as simple embedded systems, mobile handsets, and the like, to large, high-performance computing entities such as data centers or server clusters.

Conventionally, the operation of computing devices is controlled through the design and use of computer-executable program code (e.g., computer programs). For instance, a program is developed to create and locate display elements within a user interface so that such elements are output to the user in a defined format. In some instances, a designer creates the user interface and a developer creates the logic for the elements displayed in the user interface, wherein the designer and the developer employ different skill sets. However, since the elements located within the user interface can change position due to some elements being deleted or added, the geographical coordinates of each element displayed on the user interface is not known. Thus, it can be difficult for the developer to create the logic to facilitate movement and/or animation of such elements and, therefore, such animation is generally not used.

Additionally, as elements are to be moved within the user interface or as elements are to be added to or deleted from the user interface, there can be disconnect between what the user is observing and what is actually occurring with respect to the elements. For example, if an element is deleted, the element simply disappears from view with no indication of what has happened to the element. Therefore, a user might know that the element is gone from view but is not sure what has actually happened to the element. Thus, the disconnect occurs because a user is only able to view the end result, not what occurred to produce that end result.

The above-described deficiencies of today's computing system and interface visualization system techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, layout changes of elements within a user interface or other programming platform are defined relative to other elements within the user interface or other programming platform. For example, a dynamic graphical layout position of all elements can be described using a static markup definition. Further, the dynamic graphical layout position can be defined using a series of parameters. Such series of parameters can define the state of the layout without using specific location information, which might not be known.

For example, before a layout change occurs, the start position and end position of every element within a graphical interface can be calculated. The start position and end position are dynamic and, therefore, are not known to an application author when the application interface is designed. Through utilization of one or more parameters, a target position can be defined. The parameters can include a percentage offset and/or a fixed offset. Further, the parameters can include a target source element and/or element layout change data. Additionally, the parameters can include a property of the target element and/or layout change delta from which to query an immediate value at runtime. The resultant layout position is calculated as a function of one or more of the above described parameters.

In some embodiments, a layout system utilizes a series of layout input properties and provides to a rending system a set of positions. By statically defining unknown dynamic layout positions, the behavior of a layout transition animation can be defined. The layout transition animation can animate an element between an initial layout position and a final layout position. The animation can occur without specific knowledge of the layout system's output.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
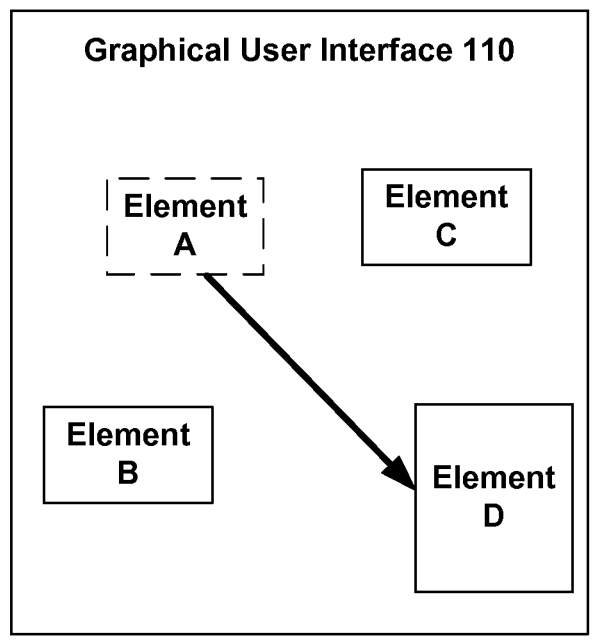
FIG. 1 is a block diagram showing a simplified view of a graphical user interface and elements displayed therein.

By way of introduction, the operation of computing devices is controlled through the design and use of computer-executable program code (e.g., computer programs). Conventionally, in application development frameworks, the concept of a "layout" describes an algorithm that positions graphical user interface elements on a display. For instance, a layout algorithm may be executed when any application state change occurs and may cause the bounding rectangles of elements and, therefore, their position and size on the display, to change. Additionally, this information generally is not directly available to the application authors but the layout algorithm will execute based on the internal implementation of all interface elements and containers in the user interface.

Similarly, even if a mechanism is supplied to automatically transition an element between two layout states, it can be difficult for application developers to specify these transition animations such that a motion path is relative to another element, such as a parent layout container. Furthermore, it is impossible for user interface designers to accomplish this within the application development frameworks, as the user interface is initially defined using a static markup representation such as Extensible Application Markup Language (XAML), which does not intrinsically allow the specification of dynamic layout positions.

In one embodiment, an interface visualization system includes a behavior manager component configured to receive at least one change request for a first element in an interface layout. The interface visualization system also includes an animation processing component configured to implement the change request to the first element as a function of a static reusable component, wherein the static reusable component is defined relative to a source element. In some implementations, the static reusable component is a markup that describes movement of the first element.

Further, the interface visualization system can include a resource analyzer component configured to describe a current state of the interface layout in anticipation of implementation of the change request. The interface visualization system can also include a delta offset component configured to compute a target layout position for the first element, wherein the target layout position is determined according to a state of a layout and the change request and wherein the first element moves relative to a layout animation motion path.

In some implementations, the target layout position is an offset described in terms of a percentage, a fixed value, a number of pixels, or combinations thereof.

In other implementations, the interface visualization system comprises a delta offset component configured to create a markup that describes movement of the first element, wherein the markup is retained as the static reusable component. In another example, the delta offset component is configured to compute a target layout position utilizing at least one of a percentage offset, a fixed offset, a target source element or element layout change delta, a property of the source element or the layout change delta from which to query an immediate value at runtime, or combinations thereof.

In some implementations, the animation processing component is configured to move the first element relative to the source element based on an origin of the source element and an offset defined in terms of the source element.

In other implementations, the first element and the source element are in a hierarchical configuration, wherein the source element is a parent element and the first element is a child element.

Further, the interface visualization system can include a visualization component configured to apply an animation as the first element is moved along a layout animation motion path, wherein the animation is defined in terms of a transition length, at least one layer property, or combinations thereof.

In other implementations, the interface visualization system includes an association component configured to associate the change request with the source element that comprises a source property. Further, the interface visualization system includes a position component configured to determine a resultant layout position for the first element as a function of the source element and the source property.

In another embodiment, a method for describing a dynamic graphical layout position includes calculating a start position and an end position of a first element in a graphical user interface and defining a target position for the first element as a function of a parameter associated with the start position or the end position.

According to some implementations, the parameter comprises at least one of a percentage offset, a fixed offset, a first layout change delta relative to the second element, a property of the second element, a second layout change delta from which to query an immediate value at runtime, or combinations thereof.

In further implementations, the defining comprises expressing the target position in a markup syntax. In an implementation, the expressing comprises estimating a layout change delta relative to the second element. The method, in some implementations, includes moving the first element along a layout animation motion path to the target position, wherein the layout animation motion path is specified relative to a second element. In further implementations, the first element and the second element are in a hierarchical order and the second element is a higher order than the first element.

The defining, in some implementations includes creating a markup that describes movement of the first element and retaining the markup as a static reusable component.

In another embodiment, a method for creating a static definition of unknown visual layout positions includes receiving an indication that a first element is to move within a user interface, wherein the first element comprises an unknown visual layout position. The method also include implementing movement of the first element based at least in part on a layout input property relative to a second element The method, in some implementations, includes identifying the second element, obtaining the layout input property associated with the second element and calculating a target location for the first element as a function of the layout input property. In accordance with some aspects, the implementing comprises animating the first element based on a definition of a static reusable component.

Herein, an overview of some of the embodiments for achieving static definitions of unknown visual layout positions has been presented above. As a roadmap for what follows next, various exemplary, non-limiting embodiments and features for dynamic graphical layout position management are described in more detail. Then, some non-limiting implementations and examples are given for additional illustration, followed by representative network and computing environments in which such embodiments and/or features can be implemented.

Static Definition of Unknown Visual Layout Positions

By way of further description, development platforms for creating user interfaces, desktop applications, web-based applications, or other programming platforms for interfaces has gained popularity. With this popularity has developed a need to describe a dynamic graphical layout position using a static markup definition without the need for specific location information. For example, when an element displayed within a graphical user interface is to automatically transition from a first layout state to a second layout state, it can be difficult for application developers to specify the transition animation of the element such that a motion path is relative to another element. Further, it can be difficult for a designer to accomplish this within application frameworks since the graphical user interface is initially defined using a static markup representation, such as XAML, which does not intrinsically allow the specification of dynamic layout positions. Thus, there has developed the need to specify animation target values that are relative to another element or set of elements, which can provide dynamic interfaces that comprise animation aspects that have a more natural, real-world feel as compared to animations currently used with interfaces, which can seem unnatural or contrived.

For instance, as shown in FIG. 1, in an example graphical user interface 110, there can be a collection of user interface elements, labeled as Element A, Element B, and Element C. The elements can be any items that are displayed and can include buttons, icons, graphical representations of objects, pictures, and so forth. In an example, Element A might change its position within the graphical user interface 110 due to a change in an application state. In some cases, Element A might also be displayed differently (e.g., color, sizing, or other appearance aspects) after the position change. For example, the size of Element A might change, which can be determined as a function of a footprint size of the graphical user interface 110 or based on other constraints. For instance, the movement and sizing of an element can be based on the number of elements that are to be displayed and, as more elements are to be displayed, the size of Element A might be made smaller or, as fewer elements are to be displayed, the size of Element A might become larger.

As shown, Element A changes position and size and becomes Element D. Conventionally, Element A would be moved in such a way that a visual and conceptual break is created. For instance, there was no transition animation provided to inform the user of what had occurred with respect to either element. Instead, Element A disappears and Element D appears. Thus, it might not be clear to the user the Element A is now Element D.

The disclosed aspects provide transition animations that are defined with respect to another element or set of elements, which mitigates the need to know the specific location information of the elements. Such transition animations can provide for movement of and changes to elements in the interface in a more fluid and natural manner. The modifications provided by the disclosed aspects can more closely mimic movement in the physical world by allowing visualization of the motion that occurs as the element moves from a first location to a second location. This is similar to watching a coffee cup move in the physical world, wherein the transition of the coffee cup between locations is noticed, rather than the coffee cup just disappearing and reappearing at a different location as is conventionally the case with elements displayed in a graphical user interface.

Conventionally, extensive programming and code is developed to describe layout position of graphical user interface elements and to create animation, which can be performed through teleportation or code that performs interpolation. Such code depends on a geographic (x-y) coordinate system, where x is the horizontal plane and y is the vertical plane. However, in many frameworks this does not apply well because the absolute coordinate system is not known. This can occur because it might not be known on which interface the application will be displayed. For instance, in some applications, there is a top-down or hierarchy of elements, wherein there are one or more parent elements, each parent element having a multitude of child elements arranged in a hierarchical manner under the parent element. In this hierarchical scheme, the parent element might rearrange its children elements when an event occurs and there is no deterministic way to know where each child element will be arranged since the children elements are arranged as a function of higher-order elements. Thus, when the logic is developed, it is not known where an element will be located until the element is actually placed in the interface. It is also difficult to write the code because the application state on every layout would have to be tracked and can change numerous times per second, which would render writing the code very time intensive.

Another scenario is a common trashcan-like concept, wherein if an element is deleted, the element is moved to the trashcan. However, the movement of the element to the trashcan is not visible to the user. Instead, the element simply disappears. If the user wants to see where the element went, the user can open the trashcan to make sure the element is in the trashcan and ready for permanent deletion. Further, the x-y coordinates of the element to be deleted, as well as the trashcan, are not known and, therefore, conventional techniques cannot provide the animations without writing extensive code because such techniques depend on the x-y coordinates.

Thus, utilization of dynamic layout positions as disclosed herein can allow specification of an animation target value that is relative to another element or set of elements, wherein the animation target value is applied as an element is deleted or modified in some other manner (e.g., added, changes size, moves within the interface, and so forth). Continuing the above example, as the element is moved to the trashcan, animation can be applied to the element with respect to one or more other elements, wherein the animation is displayed on the interface in order for the user to perceive that the element is being deleted. In accordance with the disclosed aspects, this behavior is not described by the developer, instead, the behavior is described by the designer through interaction with the interface. With conventional applications, there is no mechanism for the designer to perform this function utilizing the interface, since such functions are conventionally written in logic.

The disclosed aspects describe obtaining a graphical layout position using a static markup definition. The disclosed aspects further use a series of parameters intended to describe the state of a layout without knowing specific location information. The elements can be expressed relative to each other inside the interface in markup, not within code. Further, a storyboard that controls animations inside the user interface can be written using the markup. Thus, a designer can be in control of the interface and can easily manipulate the appearance of elements within the user interface without knowing the x-y coordinates of the elements. Further, since the disclosed aspects do not rely on platform specific code, the disclosed aspects can be applied across platforms.

Figure 2:
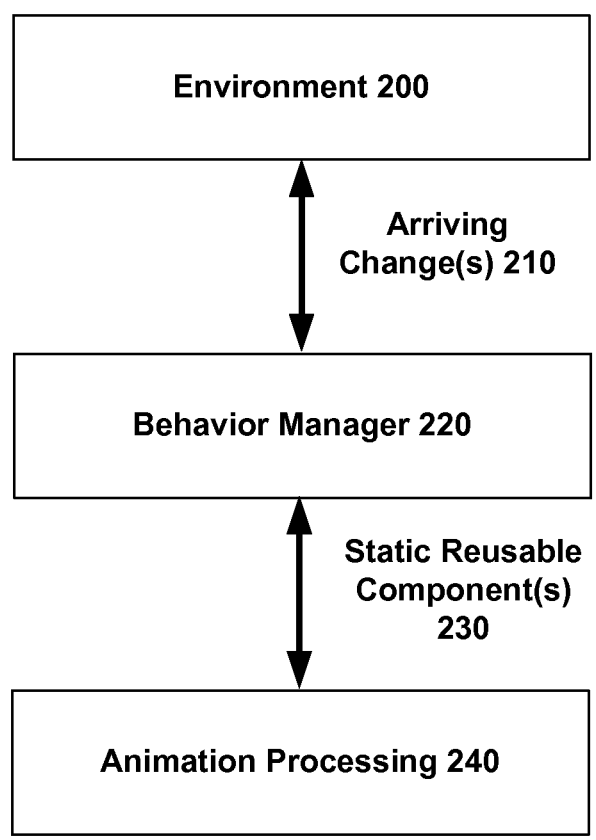
FIG. 2 is a block diagram showing a simplified interface visualization system in accordance with one or more embodiments.

A block diagram of an exemplary computing system is illustrated generally by FIG. 2. The computing system includes an environment 200, which can be a graphical user interface, a desktop application, a web-based application, or another programming platform. An indication that at least one element displayed within the environment 200 is to be added to, deleted from, or moved around within the environment 200 can be provided as input in the form of one or more arriving changes 210. Further, an animation processing component 240 can be configured within the computing system to implement one or more of the changes. For instance, a change to at least one element within the environment 200 can be received as input (e.g., in the form of a command and/or other suitable input) from one or more sources, such as a system application, a web-based application, or a user input. Animation processing component 240 can be configured to process the input as it is received or in one or more pre-specified manners. For instance, animation processing component 240 can access a static reusable component that defines a behavior to be applied to the element, wherein the static reusable component was previously defined or is defined at about the same time as the input is processed.

As further shown in FIG. 2, a behavior manager component 220 intercepts the arriving changes 210 from the environment 200 and processes respective behaviors of elements based on the arriving changes 210 to generate one or more static reusable components 230. The one or more static reusable components 230 can be subsequently provided to animation processing component 240. For instance, behavior manager component 220 can be configured to define a behavior for the element as a function of at least one parameter and calculate a resultant layout position of the element based on the parameter. In some aspects, the parameter can be a percentage offset, a fixed offset, a first layout change delta related to a second element, a property of the second element, a second layout change delta from which to query a value at runtime, or combinations thereof.

In an example, behavior manager component 220 can be configured to utilize a dynamic percentage-based range and/or a fixed static offset to describe the resultant layout position in the environment. In some embodiments, the behavior manager component 220 can be configured to describe dynamic layout positions using state markup.

Figure 3:
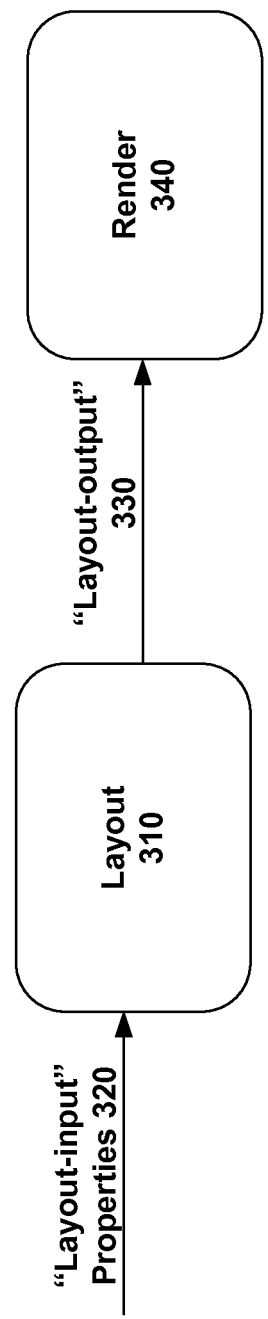
FIG. 3 is a block diagram showing exemplary functions of a interface visualization system in accordance with one or more embodiments.

In an embodiment, the interface visualization system illustrated by FIG. 2 can differ in operation from a conventional interface system in order to provide additional benefits over those achievable by computing systems that employ conventional interface systems. For example, as shown by block diagram 300 in FIG. 3, the interface visualization system disclosed herein can provide as input to a layout system 310 a series of layout input properties 320. The layout input properties 320 can include information related to a height, a width, a Grid.Column, a Parent.Children.IndexOf(this), as well as other properties. The layout system 310 can return a "layout-output" 330 to a rendering system 340. In an example, the layout-output 330 can be a set of positions. In another example, the layout-output 330 comprises an "actual" width, height, x value, y value, or other layout transitions. The ability to statically define unknown dynamic layout positions allows a user to describe the behavior of a layout transition animation that will animate between the two rendered layout positions without having specific knowledge of the layout system's output.

Figure 4:
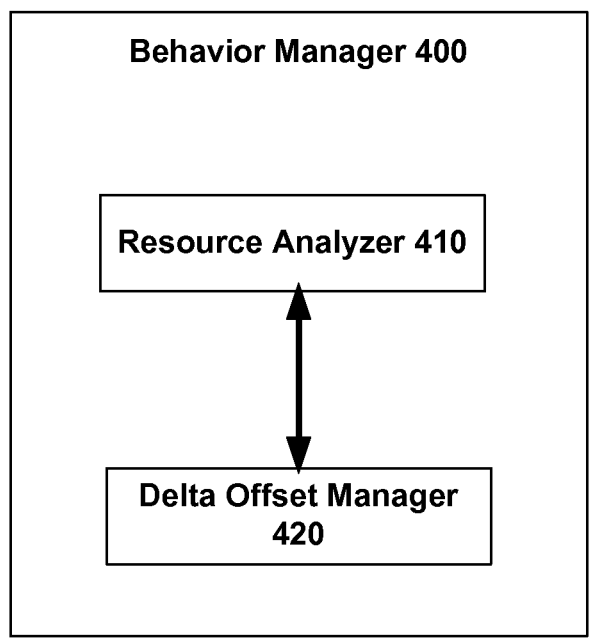
FIG. 4 is a block diagram showing exemplary functions of a behavior manager component in accordance with one or more embodiments.

Illustrating other aspects, FIG. 4 is a block diagram showing a behavior manager component 400 containing a resource analyzer component 410 and a delta offset manager component 420. In one embodiment, upon receiving at least one change request that is to be applied to a first element in an interface layout, the resource analyzer component 410 is configured to describe a current state of an interface layout in anticipation of implementation of the change request. The current state of the interface layout can be a series of parameters intended to describe the state of a layout without knowledge of specific location information.

The delta offset manager component 420 is configured to compute a target layout position for the first element. The first element can move relative to a layout animation motion path, which can have an animation determined according to the state of the layout and the change request. Thus, the delta offset manager component 420 is configured to create a markup that describes movement of the first element within a user interface, wherein the movement is described relative to another element or set of elements. The markup is static such that once the markup is created by delta offset manager component 420, the markup can be used across different layouts and user interfaces. The markup can be retained in the form of a static reusable component that can be identified though various naming conventions. When a similar behavior is to be utilized for the same element or for a different element, the static reusable component can be accessed and applied by an animation processing component, for example. This provides at least one advantage over conventional systems that utilize code for the movement because the code in such conventional systems is written for a particular platform and, to be applied to another platform, the code has to be rewritten. Since the one or more aspects disclosed herein are independent of the platform, the markup or static reusable component can be utilized across different platforms.

According to a non-limiting example, a user interface contains a first element that, according to a change request, is to transition from an initial position to a target layout position determined according to a state of an interface layout and the change request, wherein the first element moves relative to a layout animation motion path. The delta offset manager component is aware of various points along the layout animation motion path and, therefore, an animation processing component can apply various animations to the first element at any point along the path. For example, the first element might glow purple or spin around at a midpoint between its initial position and its target layout position. In order to ascertain the points between the two positions, the relative valve of the target layout position is determined. Thus, as the first element transitions along the interpolation path or layout animation path, the animation occurs at a relative point.

In an example, the relative point can be defined in terms of a percentage (e.g., 25% along the path; 70% along the path). In another example, the relative position can be defined in terms of pixels. For instance, the relative position can be defined as 100 pixels to the left of the current position of the element. In another example, the relative position can be defined as 120 pixels below a parent element. In a further example, instead of expressing the transition length in terms of a percentage or value (e.g., 50% or 0.5 times the transition length), it is expressed in terms of a layer property, which can include a percentage, a fixed value, a number of pixels, or combinations thereof. For instance, while the element is transitioning, the element can grow in size until it takes up its entire parent's panel width and, while still transitioning, the element shrinks in size in order to draw attention to the element. In this case, the animation can be defined in relative terms of a transition length, at least one layer property, or combinations thereof. In this example, the height of the element can be changed to its parent's height (scale), smaller than its parent's height, or larger than its parent's height. From the user interface design perspective, the parent's height is not known, however, utilization of a relative value allows the change to occur.

In some embodiments, the animation is defined with respect to the first element or to another element. For example, the animation can be defined with respect to a source element, wherein the source element and the first element are in a hierarchical configuration and the source element is a parent element and the first element is a child element. In some embodiments, the animation is defined with respect to the first element (e.g., move first element twenty pixels to the left). Thus, in this case, the source element is the first element whose target position and/or animation target value is defined with respect to itself.

Figure 5:
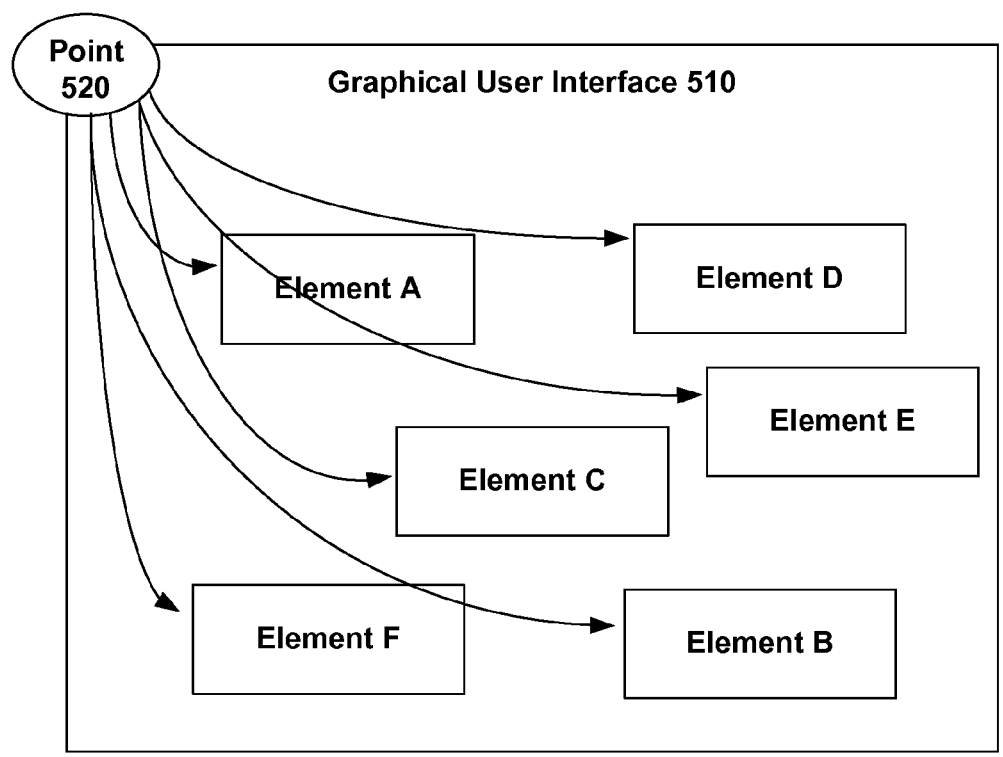
FIG. 5 is an illustration of an example graphical user interface that utilizes one or more of the disclosed aspects.

As an illustrative example of using a static reusable component, FIG. 5 illustrates an example graphical user interface 510 that utilizes one or more of the disclosed aspects. In this example, elements, labeled as Element A through Element F, can be loaded into the graphical user interface 510 in a specific manner as defined by a static reusable component. In this example, the static reusable component defines the behavior such that each element enters the interface from an origination point 520 located in a top left corner. Thus, the static reusable component can be applied to each element, irrespective of when that element is to be loaded into the interface. For example, the elements can be loaded at substantially the same time or at different times. The system does not know where each element will be located within the graphical user interface, however, the origination point 520 and the animation of the elements is defined by the static reusable component.

Figure 6:
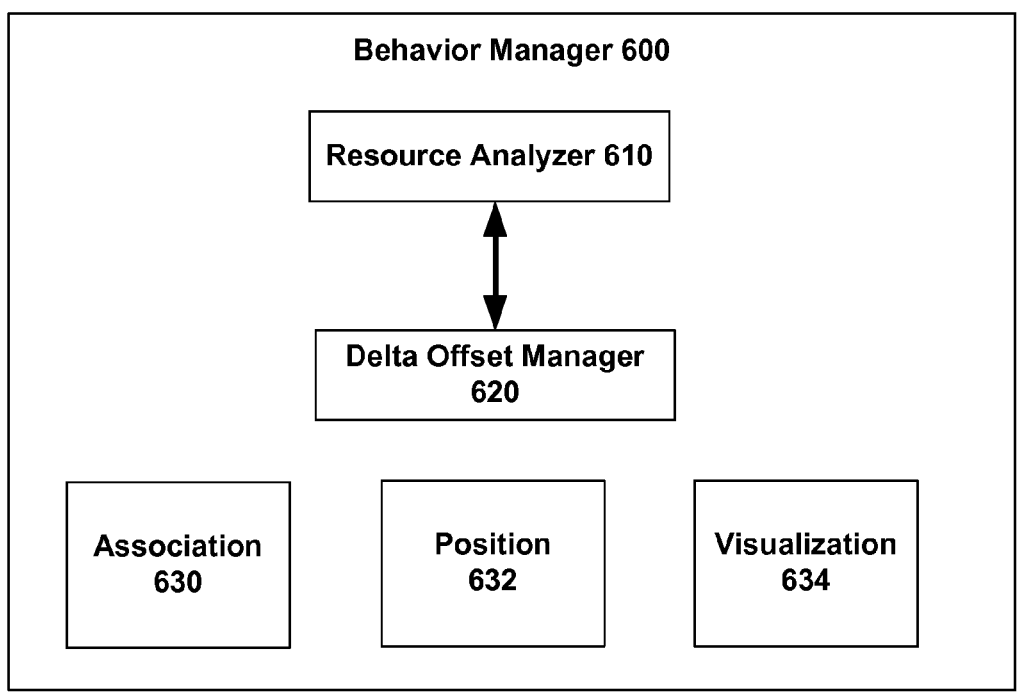
FIG. 6 is a block diagram showing exemplary functions of a behavior manager component in accordance with one or more embodiments.

Illustrating one or more additional aspects, FIG. 6 is a block diagram showing a behavior manager component 600 containing a resource analyzer component 610, a delta offset manager component 620 and respective other components 630-634 for managing elements within a programming platform or user interface. The elements can be managed though utilization of relative values as generally described herein. In one embodiment, upon receiving and/or otherwise collecting one or more changes from an external source (e.g., web application, user command) or an internal source (e.g., execution of an application), behavior manager component 600 can utilize resource analyzer component 610 to describe a current state of the interface layout. The current state is utilized by delta offset manager component 620, which is configured to determine a target layout position for one or more elements as a function of the current state and the one or more changes.

As further shown in FIG. 6, behavior manager component 600 can interact with various other components 630-634 to facilitate using a dynamic percentage-based range and/or a fixed static offset to describe a target position in a graphical layout. These components can include, e.g., an association component 630, a position component 632, and/or a visualization component 634. In one example, the association component 630 is configured to associate the change with a source element that comprises a source property. The position component 632 is configured to determine a resultant layout position for an element as a function of the source element and the source property, wherein the element is moved relative to a layout animation motion path. The visualization component 634 is configured to animate the element as the element is moved along the layout animation motion path to its respective resultant layout position, wherein the animation has target values that are specified relative to the element being animated (e.g., itself) or to one or more other elements.

In an example, resource analyzer component 610 can describe dynamic layout positions by using static markup constructs to define a layout position in a graphical user interface. Before a layout change or animation occurs, the application framework can calculate the start and end positions of every element in the graphical interface. Since these values are dynamic and therefore unable to be exposed to an application author when the application interface is being designed, a markup syntax allows the author to define a target position in the interface based on parameters, which comprise at least one of a percentage offset, a fixed offset, a target source element or element layout change delta, a property of the target element or layout change delta from which to query an immediate value at runtime, or combinations thereof.

The resultant layout position can be calculated as: the target element or transition's target property multiplied by the given percentage offset added to the given fixed offset or as:

the target element or transition's target property*the given percentage offset+the given fixed offset For example, the following non-limiting definition describes how a MarkupExtension might be utilized to describe a layout position definition using one or more embodiments described herein:

```
[MarkupExtensionReturnType(typeof(double))]
    public class LayoutValueExtension : MarkupExtension
    {
        public LayoutValueExtension( );
        public PropertyPath SourceProperty { get; set; }
        public double Origin { get; set; }
        public double Offset { get; set; }
        public LayoutValueSource Source { get; set; }
        public string SourceElementName { get; set; }
        public enum LayoutValueSource
        {
           Transition,
           ElementBeforeTransition,
           ElementAfterTransition,
           Parent,
           Plugin,
           NamedElement
        }
    }
```

Figure 7:
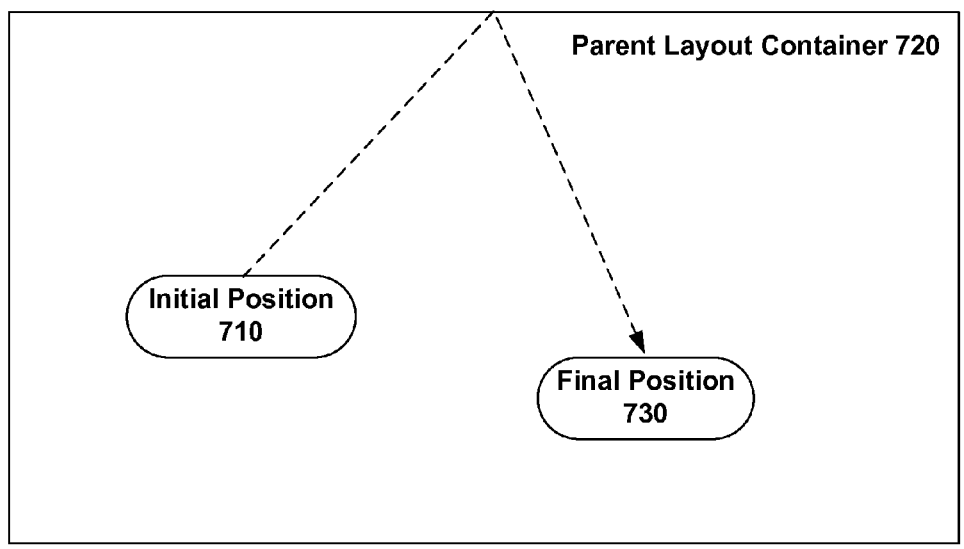
FIG. 7 is an illustrative view of an example layout animation motion path, according to an embodiment.

By way of a non-limiting implementation example of the above, FIG. 7 illustrates an example of a layout animation motion path, according to an embodiment. The disclosed aspects allow an application designer to, for instance, define an animation that animates an element from an initial layout position 710 to a top center of a parent layout container 720 associated with the element and to its final layout position 730. The element's layout animation motion path is represented by the dotted line and can be described in terms of specific values on a target element, which, in this example, is the top midpoint of the parent layout container 720. In this example, the specific value is used instead of a simple absolute value or linear interpolation. Further, the animation is defined regardless of the actual values of the initial layout position, parent container dimensions, or final layout position. In the example illustrated, a final layout position 730 of the element is defined as 50% of the parent's unknown width (x) plus a fixed offset of 0. This can be accomplished by defining the following example parameters:

SourceProperty="Width"
Source="Parent"
Origin="0.5" (representing 50% of the parent's width at the time of animation execution)

Offset="0" (representing an absolute offset of 0 pixels from the parent's center point).

A non-limiting example XAML syntax using this MarkupExtension can take the following form:

```
<Storyboard>
<DoubleAnimationUsingKeyFrames
Storyboard.TargetProperty="XPosition">
<DiscreteDoubleKeyFrame KeyTime="0:0:0" Value="{LayoutValue
Source=ElementBeforeTransition}" />
<DiscreteDoubleKeyFrame KeyTime="0:0:1" Value="{LayoutValue
Source=Parent, SourceProperty=Width, Origin=0.5, Offset=0}" />
<DiscreteDoubleKeyFrame KeyTime="0:0:2" Value="{LayoutValue
Source=ElementAfterTransition}" />
</DoubleAnimationUsingKeyFrames>
</Storyboard>
```

Figure 8:
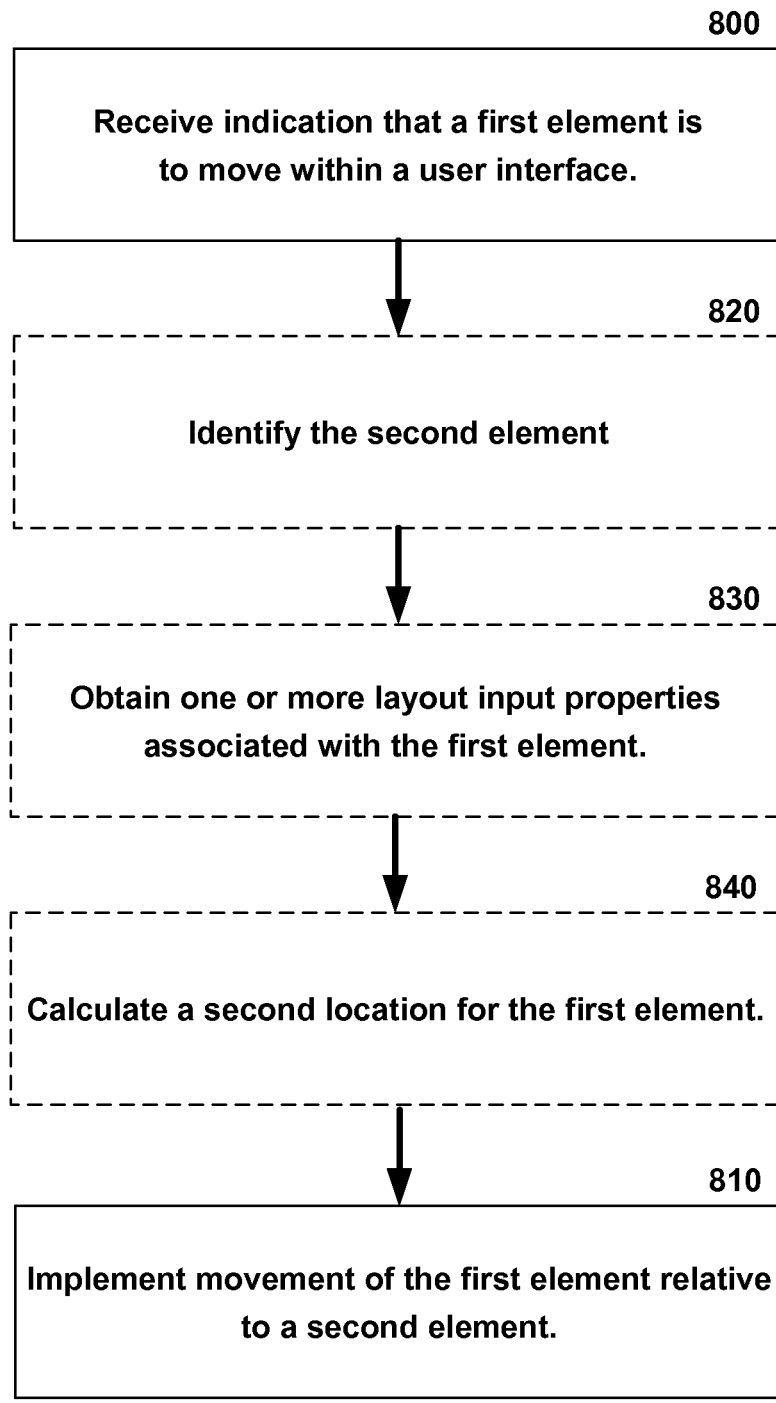
FIG. 8 is a flow diagram illustrating an exemplary non-limiting process for creating a static definition of unknown visual layout positions, according to an aspect.

FIG. 8 is a flow diagram illustrating an exemplary non-limiting process for creating a static definition of unknown visual layout positions, according to an aspect. At 800, an indication that a first element is to move within a user interface is received. The indication can be that the first element is to move from a first location to a second location. At 810, movement of the first element is implemented. The movement can be based at least in part on a layout input property that is defined relative to a second element. In an embodiment, the implementing can comprise specifying animation target values for the first element based on a definition of a static reusable component.

In some embodiments, at 820, the second element is identified and, at 830, at least one layout input property associated with the first element can be received. At 840, a second location for the first element can be calculated as a function of the layout input property.

Figure 9:
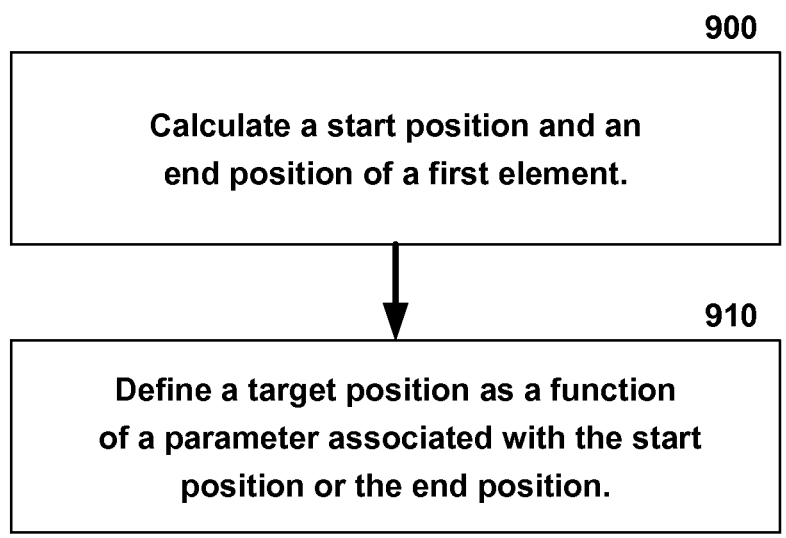
FIG. 9 is a flow diagram illustrating an exemplary non-limiting process for describing a dynamic graphical layout position.

FIG. 9 is a flow diagram illustrating an exemplary non-limiting process for describing a dynamic graphical layout position. At 900, a start position and an end position of a first element within the interface are calculated. At 910, a target position for the first element is defined as a function of at least one parameter associated with the start position or the end position. The one or more parameters comprise at least one of a percentage offset, a fixed offset, a first layout change delta relative to the second element, a property of the second element, a second layout change delta from which to query an immediate value at runtime, or combinations thereof.

In an embodiment, the defining comprises expressing the target position in a markup syntax. In an aspect, the expressing can comprise estimating a layout change delta relative to the second element. In some embodiments, the defining comprises creating a markup that describes movement of the first element and retaining the markup as a static reusable component.

In some embodiments, the first element is moved along a layout animation motion path to the target position. The layout animation motion path can be specified relative to a second element. In an aspect, the first element and the second element can be in a hierarchical order and the second element has a higher order than the first element.

Exemplary Networked and Distributed Environments

One of ordinary skill in the art can appreciate that the various embodiments of the interface visualization systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 10:
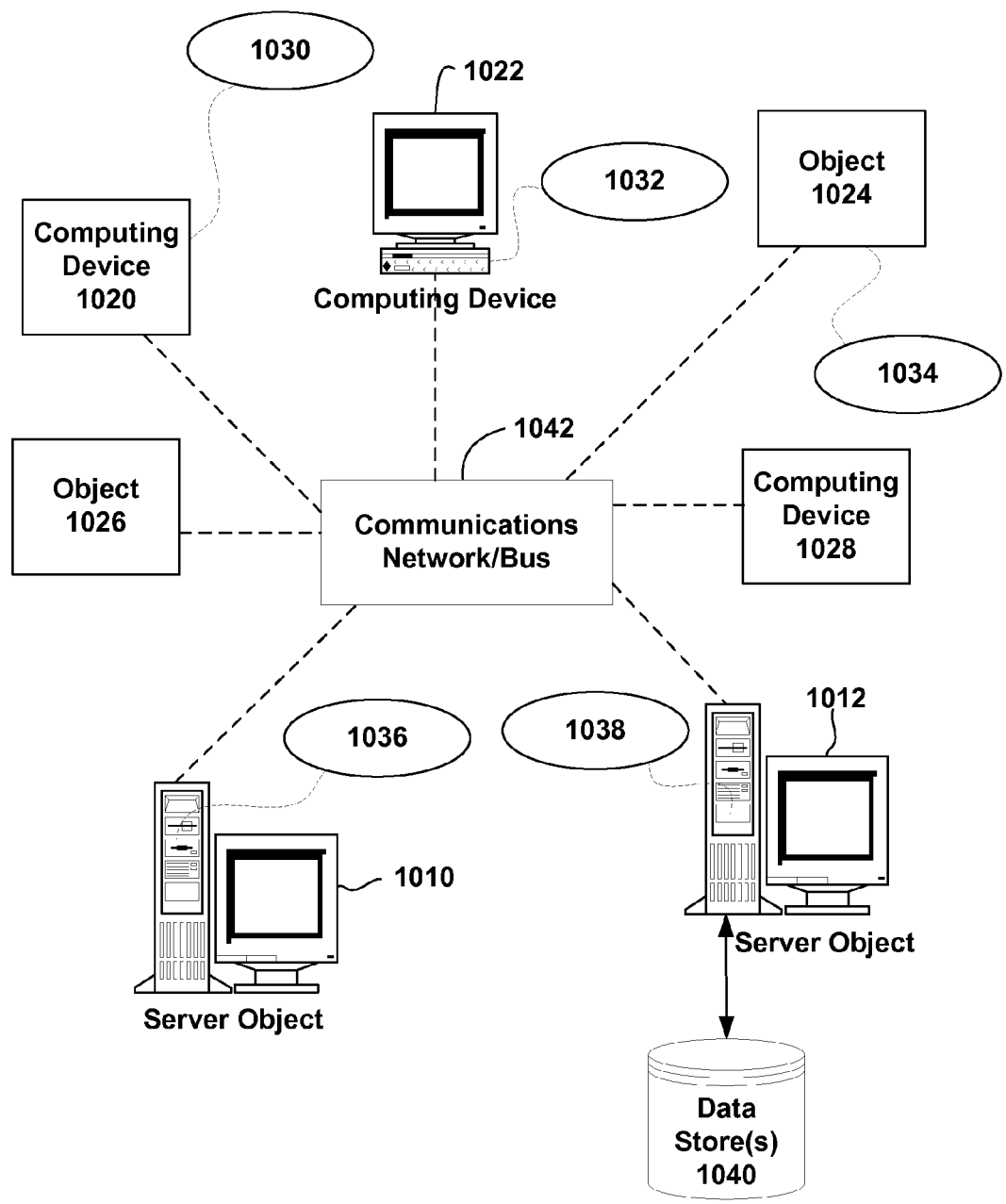
FIG. 10 is a block diagram representing exemplary non-limiting networked environments in which various embodiments described herein can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, such as personal digital assistants (PDAs), audio/video devices, mobile phones, MP3 players, personal computers, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or device 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the interface visualization techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the interface visualization systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Exemplary Computing Device

As mentioned, advantageously, the techniques described herein can be applied to any device where it is desirable to describing dynamic graphical layout positions in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 11:
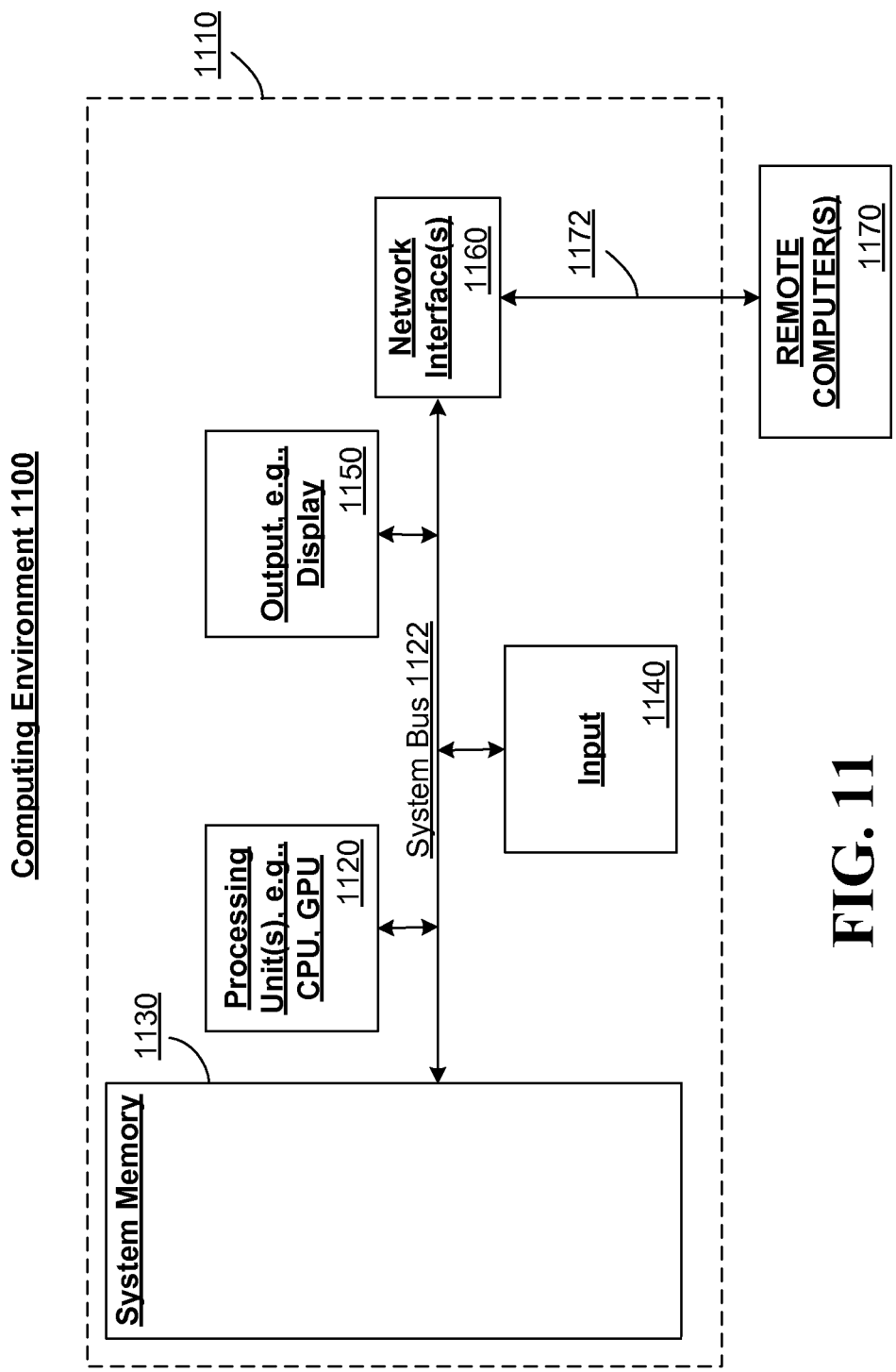
FIG. 11 is a block diagram representing an exemplary non-limiting computing system or operating environment in which one or more aspects of various embodiments described herein can be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither should the computing system environment 1100 be interpreted as having any dependency or requirement relating to any one or combination of components illustrated in the exemplary computing system environment 1100.

With reference to FIG. 11, an exemplary remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, system memory 1130 may also include an operating system, application programs, other program modules, and program data. According to a further example, computer 1110 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections, such as network interfaces 1160, to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A computing device comprising an interface visualization system, comprising:
    a behavior manager component that when executing receives at least one change request for a first element in an interface layout; and
    an animation processing component that when executing implements the at least one change request to the first element as a function of a static reusable component, wherein the static reusable component is defined relative to a source element; and
    a delta offset component that when executing creates movement information that describes movement of the first element, wherein the movement information is retained as the static reusable component.

2. The computing device of claim 1, wherein the movement information comprises a markup that describes the movement of the first element.

3. The computing device of claim 1, further comprising:
    a resource analyzer component that when executing describes a current state of the interface layout in anticipation of implementation of the at least one change request; and
    a delta offset that when executing computes a target layout position for the first element, wherein the target layout position is determined according to a state of a layout and the at least one change request and wherein the first element moves relative to a layout animation motion path.

4. The computing device of claim 3, wherein the target layout position is an offset described in terms of a percentage, a fixed value, a number of pixels, or combinations thereof.

5. The computing device of claim 1, further comprising a delta offset component configured to compute a target layout position utilizing at least one of a percentage offset, a fixed offset, a target source element or element layout change delta, a property of the source element or the layout change delta from which to query an immediate value at runtime, or combinations thereof.

6. The computing device of claim 1, wherein the animation processing component is configured to move the first element relative to the source element based on an origin of the source element and an offset defined in terms of the source element.

7. The computing device of claim 1, wherein the first element and the source element are in a hierarchical configuration, and wherein the source element is a parent element and the first element is a child element.

8. The computing device of claim 1, further comprising a visualization component configured to apply an animation as the first element is moved along a layout animation motion path, wherein the animation is defined in terms of a transition length, at least one layer property, or combinations thereof.

9. The computing device of claim 1, further comprising:
an association component configured to associate the at least one change request with the source element that comprises a source property; and
a position component configured to determine a resultant layout position for the first element as a function of the source element and the source property.

10. A method for describing a dynamic graphical layout position, comprising:
calculating a start position and an end position of a first element in a graphical user interface;
defining a target position for the first element as a function of a parameter associated with the start position or the end position;
creating a markup that describes movement of the first element; and
retaining the markup as a static reusable component.

11. The method of claim 10, wherein the parameter comprises at least one of a percentage offset, a fixed offset, a first layout change delta relative to a second element, a property of the second element, a second layout change delta from which to query an immediate value at runtime, or combinations thereof.

12. The method of claim 10, wherein the defining comprises defining the target position in a markup syntax.

13. The method of claim 12, wherein the defining comprises estimating a layout change delta relative to a second element.

14. The method of claim 12, further comprising moving the first element along a layout animation motion path to the target position, wherein the layout animation motion path is specified relative to a second element.

15. The method of claim 14, wherein the first element and the second element are in a hierarchical order and the second element is a higher order than the first element.

16. A method for creating a static definition of unknown visual layout positions, comprising:
receiving an indication that a first element is to move within a user interface, wherein the first element comprises an unknown visual layout position; and
implementing movement of the first element, based at least in part on a layout input property relative to a second element, by applying the layout input property to a static animation path description that describes animation features of the first element relative to a generic element and relative to a location-independent path between the first element and the second element, the layout input property comprising a property of a layout container containing and maintaining a layout of the first element and the second element.

17. The method of claim 16, further comprising:
identifying the second element;
obtaining the layout input property associated with the second element; and
calculating a target location for the first element as a function of the layout input property.

18. The method of claim 16, wherein the implementing comprises animating the first element based on a definition of a static reusable component, wherein the animating is defined in terms of at least one of a transition length or at least one layer property.

* * * * *